UNITED STATES PATENT OFFICE.

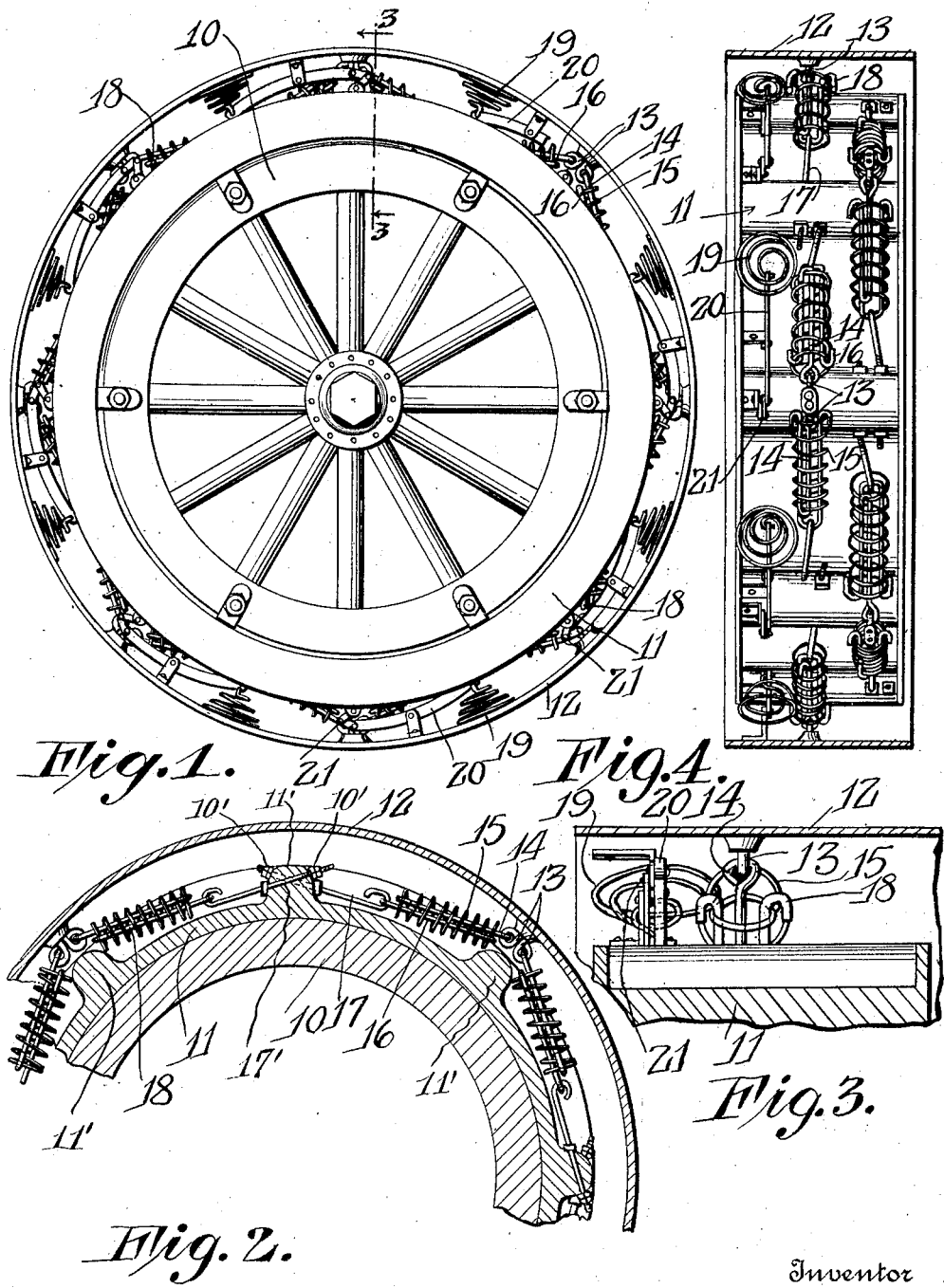

FRED. F. RANDOLPH, OF BELCHERTOWN, MASSACHUSETTS.

AUTOMOBILE-TIRE.

1,362,265.  Specification of Letters Patent.  Patented Dec. 14, 1920.

Application filed January 20, 1919. Serial No. 272,045.

*To all whom it may concern:*

Be it known that I, FRED. F. RANDOLH, a citizen of the United States, residing at Belchertown, in the county of Hampshire, State of Massachusetts, have invented certain new and useful Improvements in Automobile-Tires; and I do hereby declare the following to be a full, clear, and exact description of the invention, such as will enable others skilled in the art to which it appertains to make and use the same.

This invention relates to new and useful improvements in tires and particularly to tires for automobiles.

One object of the present invention is to provide a novel and improved tire for use on automobile wheels which is resilient and is arranged to slip on the felly of the wheel in the manner of the ordinary pneumatic tire.

Another object is to provide a novel and improved device of this character which is strong and durable, and which is capable of taking the place of the rubber tires now used, and furthermore will produce the desired resiliency.

Other objects and advantages will be apparent from the following description when taken in connection with the accompanying drawing.

In the drawing:

Figure 1 is an elevation of a wheel made in accordance with my invention.

Fig. 2 is a vertical sectional view through a portion of the tire and wheel.

Fig. 3 is an enlarged vertical transverse sectional view taken on the line 3—3 of Fig. 1.

Fig. 4 is an edge view of the tire with the rim broken away.

Referring particularly to the accompanying drawing, 10 represents the felly of the wheel on which is disposed the demountable rim 11, said rim being formed with a plurality of regularly spaced bosses 11' each alternate one having the pair of inclined openings 17' therethrough. Disposed concentrically outwardly of the rim 11 is an outer rim 12 which forms the ground engaging tread of the tire forming the subject-matter of this application. Secured to the inner face of the rim 12, and projecting inwardly in pairs toward the imperforate bosses 11', are the eye members 13 to each of which is connected one end of a tangentially extending link 14. The other end of each link is engaged longitudinally through a coil spring 15. Extending through each opening 17' and secured at one of its ends to the intermediate or bight portion of a double hook member 16, is a link 17, nuts 10' being engaged on the other ends of said links. Each of these double hook members is disposed longitudinally through one of the said coil springs 15, with its hooks engaging the end of the spring adjacent the eye 13, while the hook at the other end of the member 14 is engaged with the other end of the spring. Thus when the hook members and links are moved away from each other the springs will be compressed, as will be understood from an inspection of the drawing.

Secured at one end to a conical spring 19, which is carried by the inner face of the rim 12, is a longitudinally curved lever 20, the intermediate portion being pivotally secured to the inner face of said rim. The other end of this lever is connected to one of the bosses 11' of the rim 11 by means of a hinge joint 21. These levers, of which there are a plurality arranged at equispaced distances around the tire, serve to prevent too great relative rotation of the rims 11 and 12, while at the same time the springs 19 permit the movement of the rims, in conjunction with the springs 15, in the operation of the tire.

What is claimed is:

A resilient tire comprising inner and outer concentrically arranged rims, the inner rim having a circular series of regularly spaced outwardly extending bosses, every alternate one of said bosses being formed with a pair of oppositely inclined openings, an eye member carried by the outer rim outwardly of each imperforate boss, a link connected to each eye member and extending toward an apertured boss, a rod engaged in each opening of a perforated boss, a loop member connected to each of the rods, a coil spring embracing a loop member and a link and being engaged by one end of said loop member, conical springs carried by the outer rim between the bosses, and longitudinal curved links pivoted centrally to the outer rim and movably connected to the conical springs and to the inner rim.

In testimony whereof I affix my signature, in the presence of two witnesses.

FRED. F. RANDOLPH.

Witnesses:
RAYMOND GRAY,
ELLA A. STEBBINS.